(12) United States Patent
Theologou

(10) Patent No.: US 10,556,566 B2
(45) Date of Patent: Feb. 11, 2020

(54) CARGO BLIND END CAP ASSEMBLY IN A VEHICLE

(71) Applicant: Ford Global Technologies, LLC, Dearborn, MI (US)

(72) Inventor: Nick Theologou, Melbourne (AU)

(73) Assignee: Ford Global Technologies LLC, Dearborn, MI (US)

( * ) Notice: Subject to any disclaimer, the term of this patent is extended or adjusted under 35 U.S.C. 154(b) by 325 days.

(21) Appl. No.: 15/433,184

(22) Filed: Feb. 15, 2017

(65) Prior Publication Data
US 2017/0253215 A1    Sep. 7, 2017

(30) Foreign Application Priority Data

Mar. 4, 2016 (CN) .......................... 2016 1 0122535

(51) Int. Cl.
*B60R 22/18*    (2006.01)
*B60R 5/04*    (2006.01)

(52) U.S. Cl.
CPC .............. *B60R 22/18* (2013.01); *B60R 5/047* (2013.01); *B60R 2022/1806* (2013.01); *B60R 2022/1812* (2013.01)

(58) Field of Classification Search
CPC ............ B60R 22/18; B60R 2022/1806; B60R 2022/1812; B60R 22/22; B60R 22/24; B60R 2022/266; B60R 5/047; Y10T 24/63401; Y10T 24/4588; Y10T 24/44017; Y10T 24/44026

USPC .............................................. 280/801.2, 808
See application file for complete search history.

(56) References Cited

U.S. PATENT DOCUMENTS

| 3,076,679 | A |   | 2/1963 | Mortimer |
| 3,178,222 | A |   | 4/1965 | Anderson et al. |
| 3,228,726 | A |   | 1/1966 | Petersen |
| 4,810,037 | A |   | 3/1989 | Takagi |
| 5,746,448 | A |   | 5/1998 | Apfel |
| 5,784,767 | A | * | 7/1998 | Doty, Jr. ............. A44B 11/2511 24/665 |
| 6,039,105 | A | * | 3/2000 | Patmore .................. B60R 5/047 160/121.1 |

OTHER PUBLICATIONS

Hyundai Elite i20: Official Review, p. 46-47, http://www.team-bhp.com/forum/official-new-car-reviews/155025-hyundai-elite-i20-official-review.html; Sep. 3, 2014.
Hyundai Elite i20: Official Review, http://www.team-bhp.com/forum/official-new-car-reviews/155025-hyundai-elite-i20-official-review.html.

* cited by examiner

*Primary Examiner* — Katherine W Mitchell
*Assistant Examiner* — Jeremy C Ramsey
(74) *Attorney, Agent, or Firm* — Alice Xu; Kolitch Romano LLP

(57) ABSTRACT

A cargo blind end cap assembly of a vehicle comprises an end cap to receive a cargo blind bar and a seat belt retainer to retain and release a seat belt tongue. The seat belt retainer is coupled to the end cap.

20 Claims, 9 Drawing Sheets

CARGO BLIND END CAP ASSEMBLY IN A VEHICLE

RELATED APPLICATION

This application claims the benefit of Chinese Patent Application No.: CN 201610122535.5 filed on Mar. 4, 2016, the entire contents thereof being incorporated herein by reference.

FIELD OF INVENTION

The present application relates to a cargo blind end cap assembly in a vehicle, in particular, relates to a cargo blind end cap assembly including a seat belt retainer.

BACKGROUND OF THE INVENTION

In a vehicle such as a SUV and a van, a cargo blind system may be installed to cover cargo in a rear area of the vehicle. In some situations, back seats may be put down to create more space for the cargo and thus leave the seat belts of the back seats hang on the rear quarter panel of the vehicle. When a cargo blind is pulled to a fully extended position, the cargo blind may snag the seat belt webbing and drag the seat belt along with the cargo blind. As a result, the cargo blind may bunch up because of the dragging of the seat belt. Further, the seat belt webbing may be twisted and the seat belt tongue may hit the interior trim of the vehicle when a lift gate of the vehicle is put down.

One solution to the above-described problem is to mount seat belt clips on the quarter trim panels. The seat belt clips hold the seat belt tongues or the seat belt webbings to the trim panels so that the seat belts are out of the way when the cargo blind is extended.

However, the inventor herein has recognized the disadvantages with such solution. Specifically, the seat belt clips are molded or mounted onto the quarter trim panel permanently. As result, there is an additional manufacturing procedure for the quarter trim panel. Further, the visibility of the seat belt clips decreases the aesthetic appearance of the vehicle's interior panels.

SUMMARY

According to one aspect of the present disclosure, a cargo blind end cap assembly of a vehicle may comprise an end cap to receive a cargo blind bar; and a seat belt retainer to retain and release a seat belt tongue, wherein the seat belt retainer is coupled to the end cap.

In one embodiment, the seat belt retainer may comprise a base having a first end and a second end opposite to the first end. The base may include a first sidewall and a second sidewall opposite the first sidewall which are between the first and the second ends, a slot sidewall on the first end of the base, a slot formed in the slot sidewall, and a clip disposed on the base. The clip may be configured to fasten a seat belt tongue inserted from the slot.

In another embodiment, the clip may be positioned along the first and second sidewalls, and the clip may include a free end adjacent to the slot and a fixed end secured to the base adjacent to the second end of the base.

In another embodiment, the clip may be a flat strap having a protrusion at the free end. The protrusion may have a guide surface to guide the seat belt tongue to move over the protrusion when the seat belt tongue is inserted and an engagement surface substantially perpendicular to the flat strap to engage the seat belt tongue. The clip may have elasticity to allow movement of the free end in a direction substantially perpendicular to a pathway that the seat belt tongue is inserted.

In another embodiment, the guide surface of the protrusion may have an angle to the pathway and may be inclined at a steady slope from the flat strap toward the fixed end of the clip, or the guide surface may be inclined as convex shaped or a concave shaped from the flat strap toward the fixed end of the clip.

In another embodiment, the flat strap further may include a raised portion raised in a same direction as the protrusion projects from the flat strap, and the protrusion may disengage the seat belt tongue when a force is applied to the raised portion.

In another embodiment, the raised portion may be formed from bends of the flat strap and has a top surface substantially parallel to a surface of an unraised portion of the flat strap.

In another embodiment, the seat belt retainer may further include a cover disposed opposite to the base. The cover, the first sidewall, the second sidewall, the slot sidewall and a third sidewall opposite the slot sidewall collectively may enclose the clip.

In another embodiment, the cover may have an opening to expose the raised portion of the clip.

In another embodiment, the flat surface of the raised portion of the clip may be substantially at a same level as an out surface of the cover or protrudes outside the out surface of the cover.

In another embodiment, the cover may be snapped into the base or may be coupled to the base by screws.

In another embodiment, the base may include an opening and the clip may be positioned at least partially inside the opening.

In another embodiment, the end cap may include a housing to receive a cargo blind bar, and the housing includes an end wall, a bottom wall and a top wall.

In another embodiment, the seat belt retainer may be attached to the bottom wall of the end cap and the base may be substantially perpendicular to the bottom wall, substantially parallel to the end wall of the end cap, and adjacent to the end wall of the end cap.

In another embodiment, an open channel of the slot wall may extend along a direction substantially parallel to the end wall of the end cap, and the slot inside the slot sidewall opens in a direction that a cargo blind is pulled out.

In another embodiment, an open channel of the slot wall may extend along a direction perpendicular to the bottom wall of the end cap, and the slot inside the slot sidewall opens in a direction away from the end cap.

In another embodiment, the seat belt retainer may be integrated with the end cap.

According to another aspect of the present disclosure, a cargo blind system of a vehicle is provided. The cargo blind system may comprise a cargo blind; a cargo blind bar to store and release the cargo blind; a first cargo blind end cap assembly including a first end cap to receive one end of the cargo blind bar; a first seat belt retainer to retain and release a first seat belt tongue. The first seat belt retainer may include a slot formed in a slot sidewall, and a clip configured to fasten the first seat belt tongue inserted from the slot, and the first seat belt retainer may be attached to the first end cap. The cargo blind system may further comprise a second cargo blind end cap assembly including a second end cap to receive another end of the cargo blind bar; and a second seat belt retainer to retain and release a second seat belt tongue.

The second seat belt retainer may include a slot formed in a slot sidewall, and a clip configured to fasten the second seat belt tongue inserted from the slot, and the second seat belt retainer may be attached to the second end cap.

In one embodiment, the first and second seat belt retainers may receive the first and second seat belt tongues, respectively, when back seats are put down to provide a cargo space.

In another embodiment, a distance between a center of the slot of the first seat belt retainer and a center of the slot of the second seat belt retainer may be greater than a widest portion of the cargo blind.

The cargo blind end cap assemblies of the present disclosure are advantageous because a seat belt retainer is integrated with a cargo blind system. In this way, there is no need to mount a separate device on the vehicle interior panels to hold the seat belts, and thus eliminating such processing step on the vehicle panels. Additionally, the vehicle interior panels remain clean appearance when the seat belt retainer is removed with the cargo blind system from the vehicle.

It should be understood the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
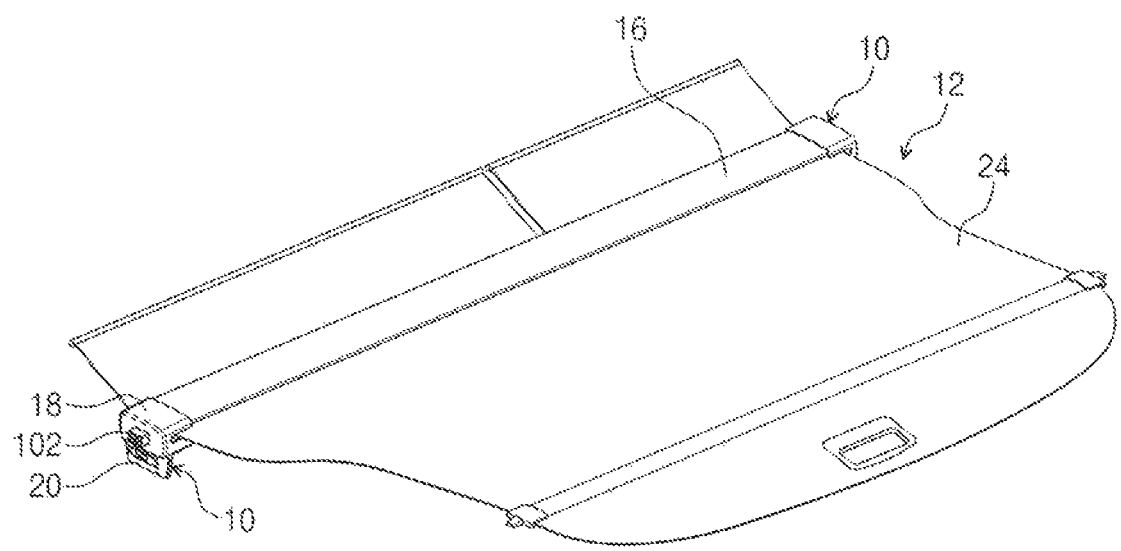
FIG. 1 is a perspective view of an example embodiment of a cargo blind system in a vehicle.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the present disclosure will now be described more fully with reference to the accompanying drawings, in which example embodiments are shown. Example embodiments of the present disclosure may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. Like reference numerals in the drawings denote like elements, and thus their description will be omitted.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Figure 1A:
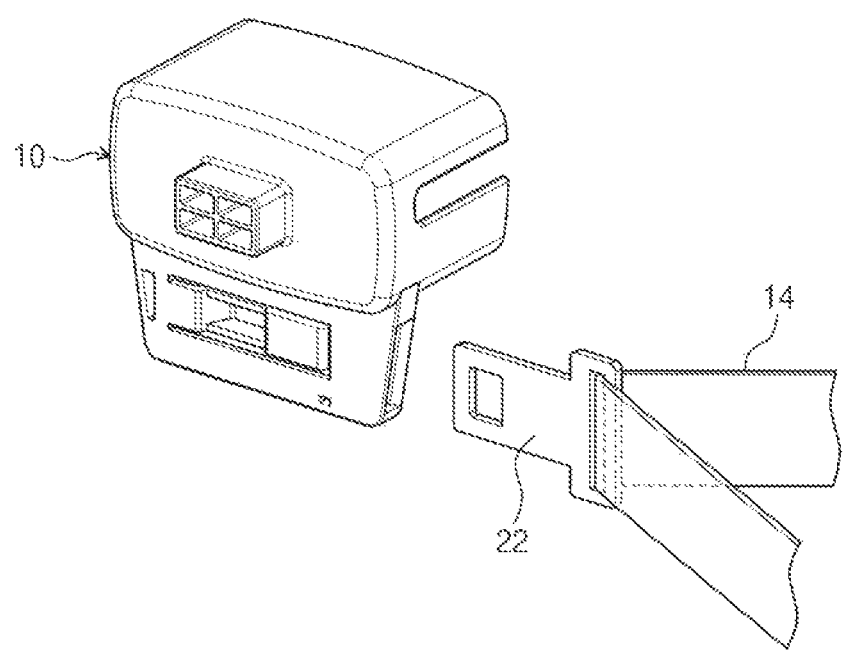
FIG. 1A is a perspective view of an example embodiment of a cargo blind end cap assembly of the cargo blind system of FIG. 1, schematically illustrating an insertion of a seat belt to the cargo blind end cap assembly.

FIG. 1 a perspective view of an example embodiment of a cargo blind system 12 in a vehicle. The cargo blind system 12 may include two cargo blind end cap assemblies 10 and a cargo blind bar 16. The cargo blind end cap assembly 10 may include an end cap 18 to receive an end of the cargo blind bar and a seat belt retainer 20. FIG. 1 shows that the cargo blind 24 is in a fully extended position. FIG. 1A illustrates an insertion of a seat belt tongue 22 of a seat belt 14 to the cargo blind end cap assembly 10.

In the depicted embodiment, the seat belt 14 may be the seat belt of a back seat (not shown) and may not be in use when the back seat is folded flat to provide a rear cargo space. The cargo blind system 12 may be installed in the vehicle by placing two end caps 18 on the panels of the vehicle. Once installed, the cargo blind 24 may be pulled out in the extended position to cover a rear area of the vehicle. The cargo blind system 12 may be removed from the vehicle when the back seats are put back to use.

Figure 2:
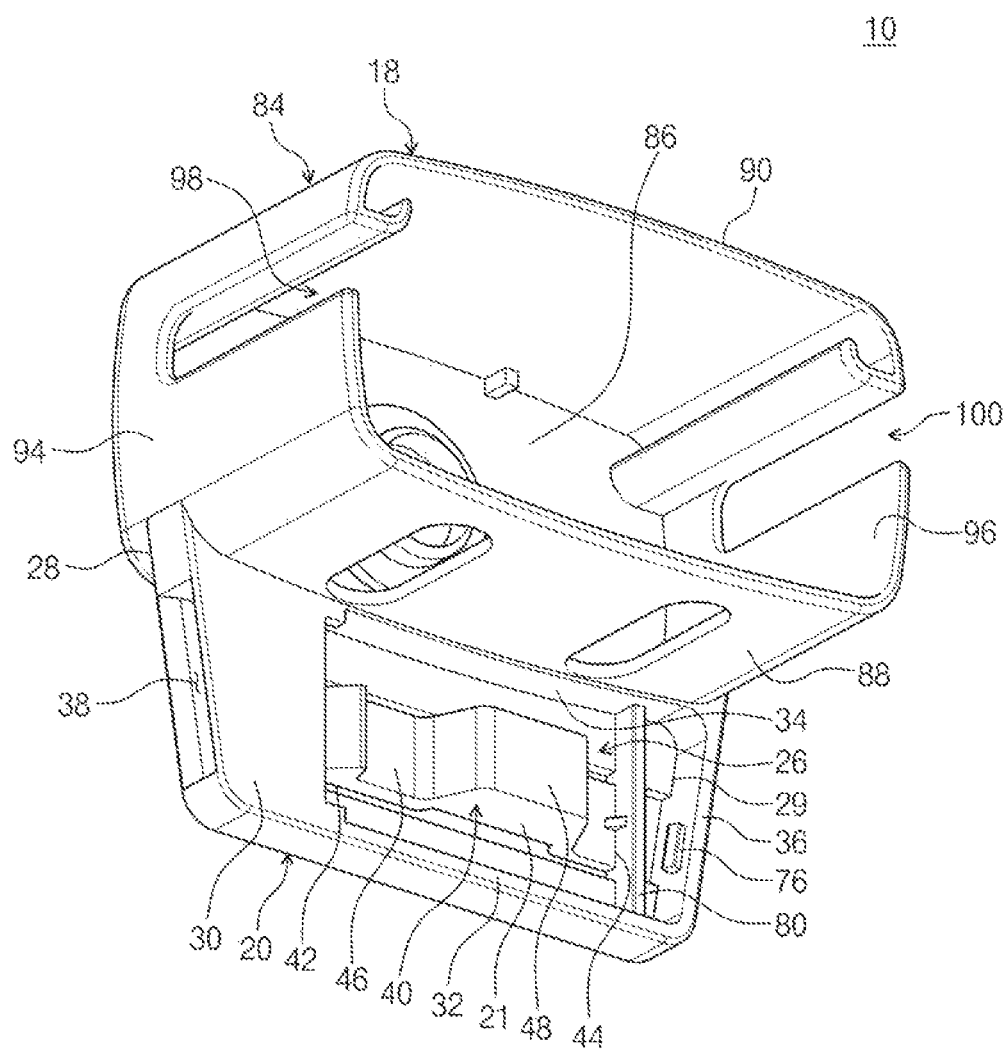
FIG. 2 is a perspective view of an example embodiment of a cargo blind end cap assembly.

FIGS. 2-5 illustrate one example embodiment of the cargo blind end cap assembly 10. FIG. 2 is a perspective view of the cargo blind end cap assembly 10. As shown in FIG. 2, the cargo blind end cap assembly 10 may include the end cap 18 and the seat belt retainer 20. In some embodiments, the seat belt retainer 20 may be coupled to the end cap 18 to form a single piece assembly. In some embodiments, the seat belt retainer 20 may be integrally formed with the end cap 18. The seat belt retainer 20 and the end cap 18 may be made from the same material such as plastic or polymer materials.

Alternatively, the seat belt retainer 20 and the end cap 18 may be made from different materials.

Figure 3:
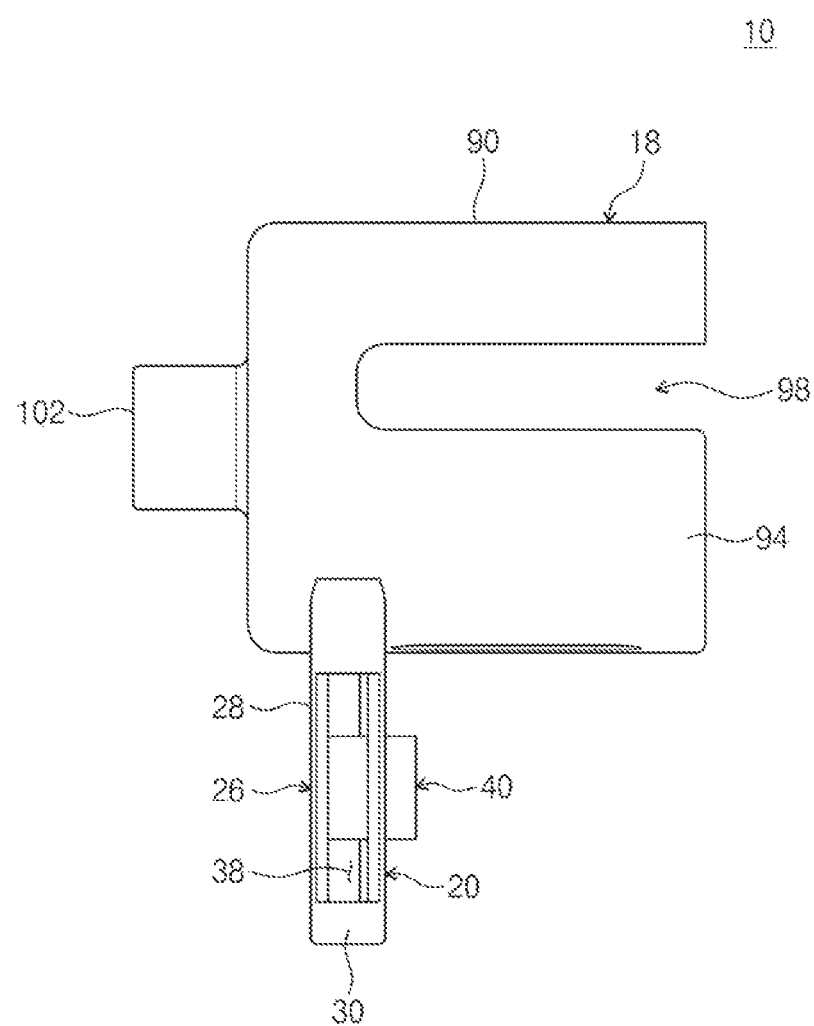
FIG. 3 is a side view of the cargo blind end cap assembly of FIG. 2.
Figure 4:
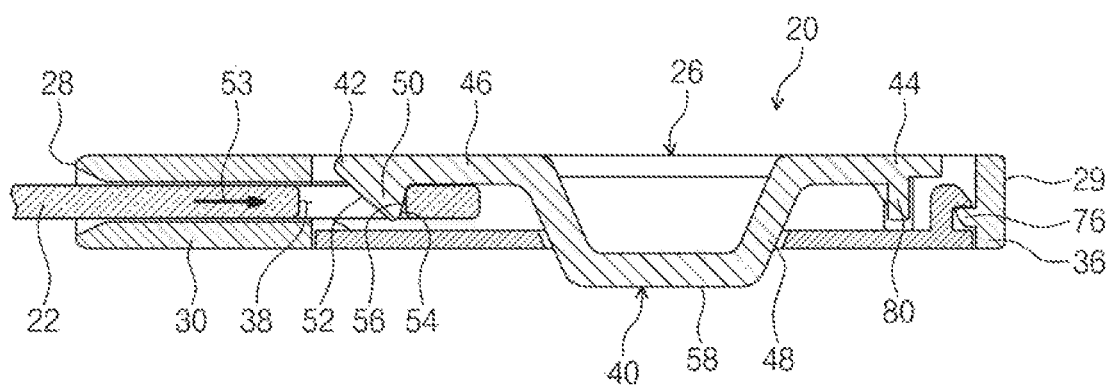
FIG. 4 is a cross-sectional view of the seat belt retainer of FIG. 2, shown in a coupling with a seat belt tongue.

Referring to FIGS. 2-4, the seat belt retainer 20 may include a base 26 having a first end 28 and a second end 29 opposite to the first end 28. The base may include a slot sidewall 30 formed at the first end 28, a first sidewall 32, and a second sidewall 34 opposite the first sidewall 32, and a third sidewall 36 opposite the slot sidewall 30. A slot 38 may be formed in the slot sidewall 30 and may include an open channel configured to allow an insertion and release of the seat belt tongue 22.

The seat belt retainer 20 may include a clip 40 configured to fasten or secure the seat belt tongue 22 inserted from the slot 38. In some embodiments, the clip 40 may be disposed on the base 26. The clip may be positioned along the first sidewall 32 and the second sidewall 34. The clip may include a free end 42 adjacent to the slot 38 and a fixed end 44 connected to the base 26. In some embodiments, the fixed end 44 of the clip 38 may be disposed adjacent to the second end 29 of the base 26. In some embodiments, at least portion of the clip 40 may include a flat strap 46 configured to have elasticity such that the free end 42 may be moved up and down relative to the base 26 under a force and substantially returned to an original position with removal of the force. In some embodiments, the clip 40 may further include a raised portion 48.

Referring to FIG. 4, the clip 40 of the seat belt retainer 20 may include a protrusion 50 at the free end 42 and the protrusion 50 may project toward a pathway 53 that the seat belt tongue 22 is inserted. In some embodiments, the protrusion 50 may have a guide surface 52. In depicted embodiment, the guide surface 52 may have an angle to the pathway 53 and may be inclined at a steady slope from the flat strap 46 in a direction away from the slot sidewall 30 or inclined toward the fixed end 44 of the clip 40. Alternatively, the guide surface 52 may be inclined as convex shaped or a concave shaped in the direction away from the slot sidewall 30 or inclined toward the fixed end 44 of the clip 40. It should be appreciated that the guide surface 52 may include any suitable shape that guides and facilitate the insertion of the seat belt tongue 22. The protrusion 50 may further include an engagement surface 54 that may be substantially perpendicular to the pathway 53. When the seat belt tongue 22 is inserted from the slot 38, a front end of the seat belt tongue 22 contacts the guide surface 52 and pushes the free end 42 away from the pathway 53. As the seat belt tongue 22 moves further, an opening of the seat belt tongue 22 is exposed to the protrusion 50 and the protrusion 50 moves back with the engagement surface 54 contacting an inner surface 56 of the seat belt tongue 22. In this way, the seat belt tongue 22 can be secured to the seat belt retainer 20.

Figure 9:
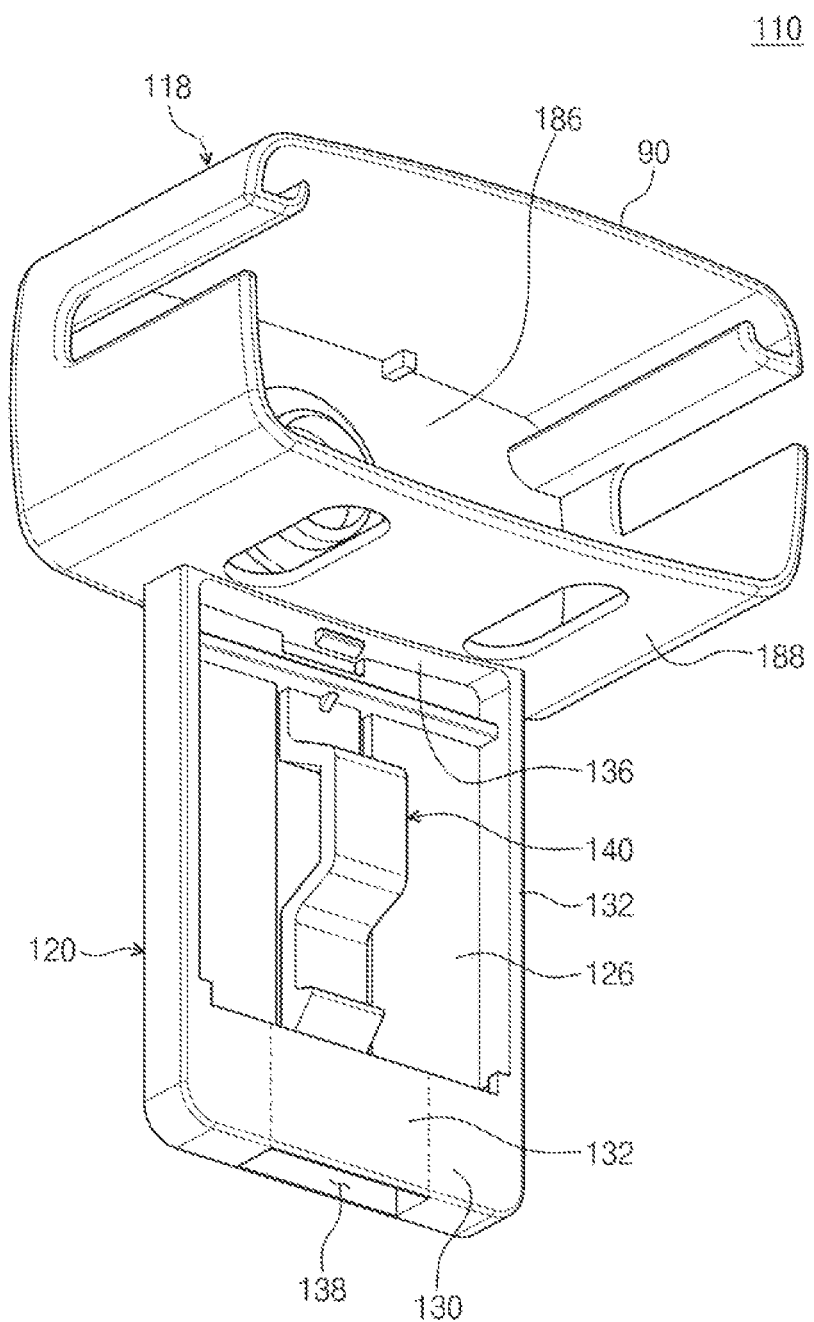
FIGS. 9 and 10 are a perspective view of another example embodiment of a cargo blind end cap assembly.
Figure 10:
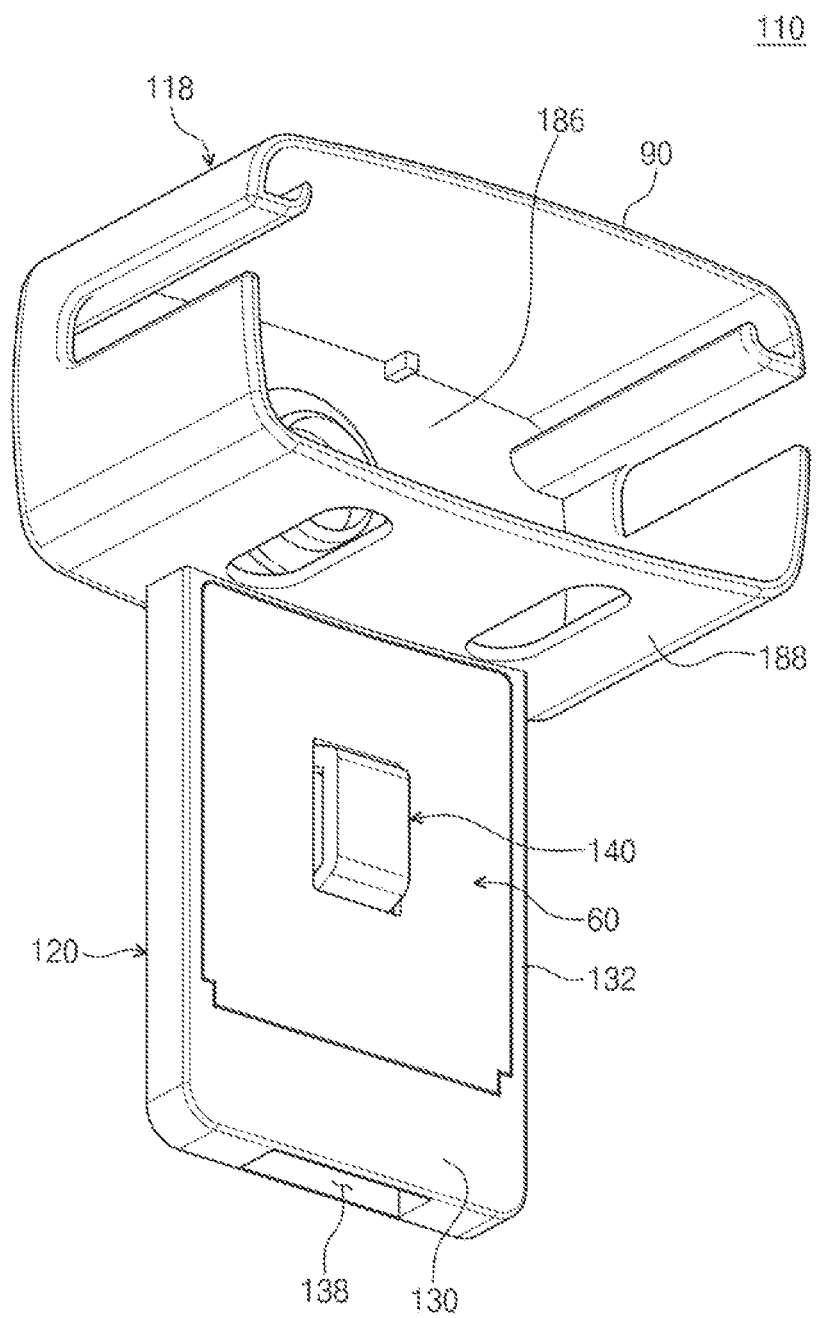

In some embodiments, the clip 40 may include the raised portion 48. The raised portion 48 may be raised in a same direction as the protrusion 50 projects from the clip 40. The raised portion 48 may include a flat surface 58 substantially parallel to a surface of an unraised portion of the flat strap. When a user applies a force to the flat surface 58, the protrusion 50 may be moved away from the seat belt tongue 22 so that the seat belt tongue is released from the seat belt retainer 20. In some embodiments, the raised portion 48 may include sidewalls extending from the flat surface 58 such that the raised portion may have a button-like shape (see FIG. 2). FIG. 2 shows one sidewall 21 of the raised portion 48. In some embodiments, the raised portion 48 may be formed from bends of the flat strap 46 as shown in FIGS. 9 and 10.

It should be appreciated that other configurations of the clip may be possible. For example, the clip may include a flat strap without bends. A button-like block may be formed on the flat strap to facilitate application of a force by a user to release the seat belt tongue.

Further, it should be appreciated that the seat belt retainer may have any suitable structure that is capable of retaining and releasing the seat belt. For example, the seat belt retainer may include a base and a magnet attached to the base. The seat belt tongue may be secured to the magnet by a magnetic force and may be released by a force pulling the seat belt tongue.

Figure 5:
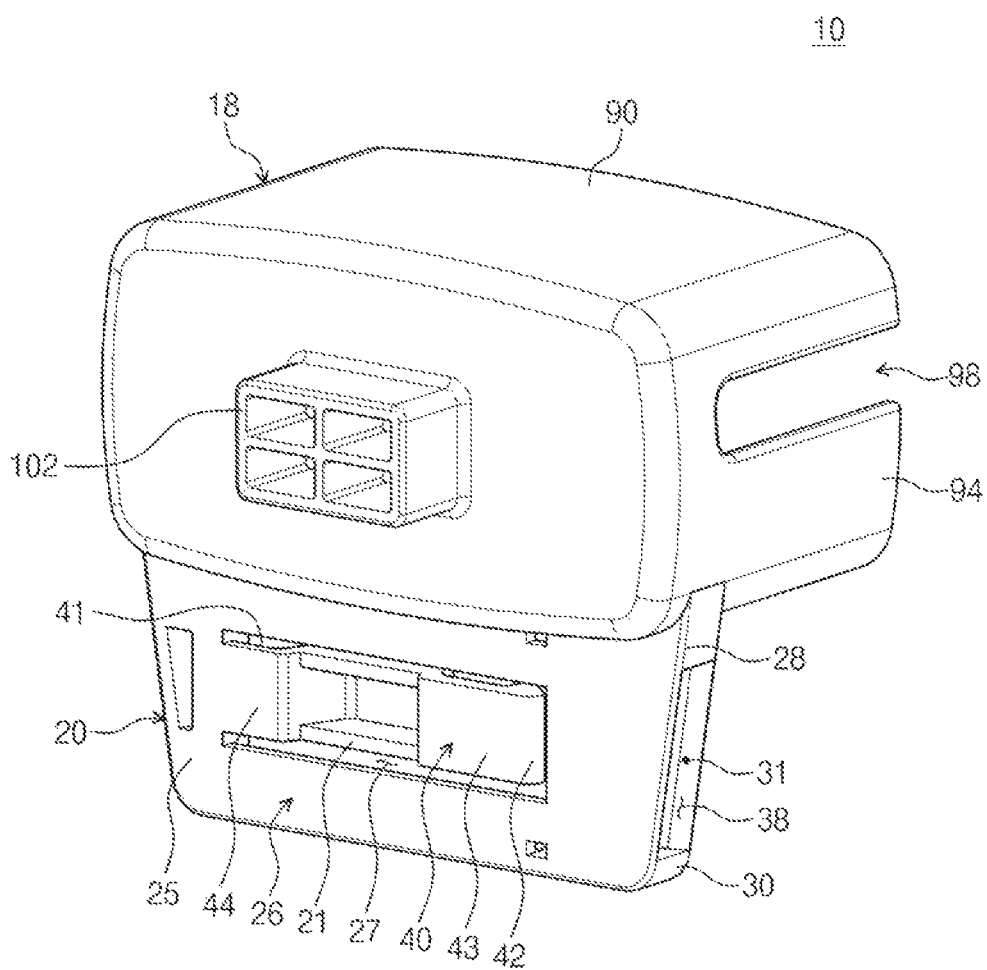
FIG. 5 is a perspective view of an example embodiment of a seat belt retainer, showing a view from an outside of the seat belt retainer.

Referring to FIG. 5, the base 26 may include an opening 27. In the depicted embodiment, the base 26 may include an elongated opening 27 to accommodate the clip 40. The fixed end 44 of the clip 40 may be disposed on a short side of the elongated opening 27 and may extend toward the slot sidewall 30. At least portions of the clip 40 may be disposed inside the elongated opening 27. The positioning of the clip inside the elongated opening 27 allows the free end 42 of the clip 40 to move up and down relative to the base 26 freely. In some embodiments, the clip may include a rib 41 disposed adjacent to the fixed end 44 to adjust the stiffness of the clip 40. In some embodiments, a bottom surface 43 of at least one portion of the clip 40 may be substantially parallel to a bottom surface 25 of the base 26. In another embodiment, the bottom surface 43 of at least one portion of the clip 40 may be substantially at a same plane as the bottom surface 25 of the base 26 as shown in FIG. 4. FIG. 5 also shows a center 31 of the slot 38.

Figure 6:
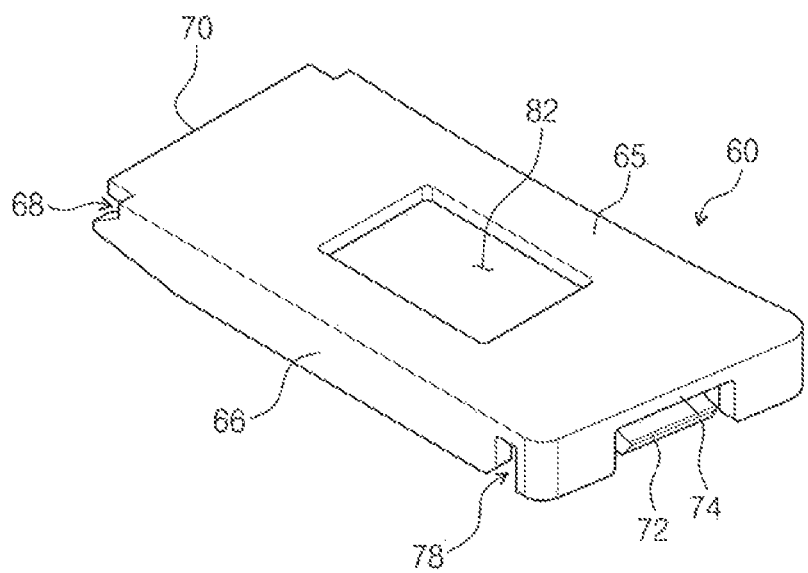
FIG. 6 is a perspective view of an example embodiment of a cover of a seat belt retainer of a cargo blind end cap assembly.
Figure 7:
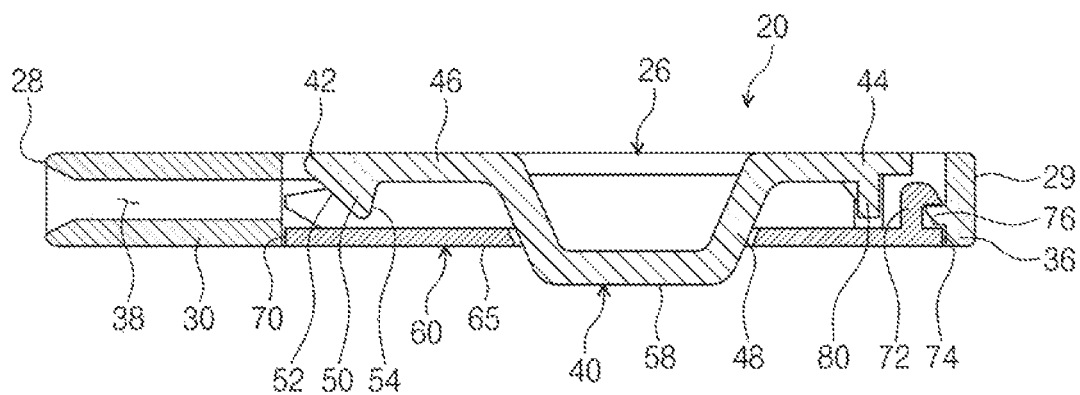
FIG. 7 is a cross-sectional view of a seat belt retainer of a cargo blind end cap assembly, showing the cover of FIG. 6 fitted into the seat belt retainer.
Figure 8:
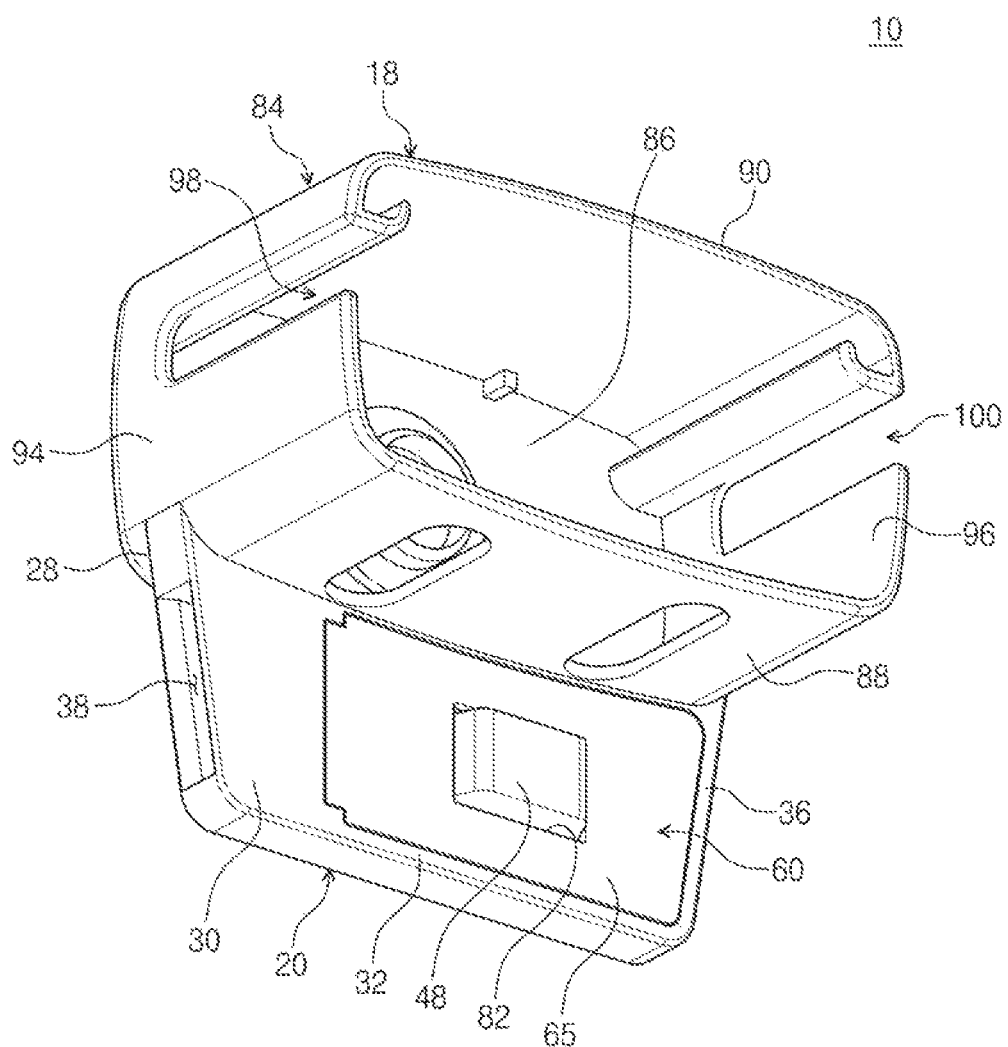
FIG. 8 is a perspective view of an example embodiment of a cargo blind end cap assembly, showing the cover of FIG. 6 fitted into the seat belt retainer.

Referring to FIGS. 6, 7 and 8, in some embodiments, the seat belt retainer 20 may include a cover 60 disposed opposite the base 26. The cover 60, the first sidewall 32, the second sidewall 34, the slot sidewall 30 and the third sidewall 36 may collectively enclose the clip 40. In some embodiments, an out surface 65 of the cover 60 may be substantially at a same plane as corresponding out surfaces of the first sidewall 32, the second sidewall 34, the slot sidewall 30 and the third sidewall 36. In some embodiments, the cover 60 may be snapped into the base 26. For example, referring to FIG. 6, the cover 60 may include two sidewalk 66 opposite each other and each having a wedge portion 68 at one end 70. The wedge portion 68 may fit into a space in the base 26. Referring to FIGS. 2 and 6-7, the cover 60 may further include a hook 72 at another end 74 of the cover 60 and the hook 72 may be configured to be clipped to a lip 76 on the base 26 (see FIG. 2). In another embodiment, the cover 60 may further include recesses 78 to be disposed on a rib 80 of the base 26 (see FIG. 2). It should be appreciated that any suitable approach may be used to secure the cover 60 to the base 26. For example, the cover 60 may be secured to the base 26 by screws.

In some embodiments, the cover 60 may include an opening 82 configured to expose the raised portion 48 of the clip 40. In some embodiments, the flat surface 58 of the raised portion 48 may be substantially at a same level as the out surface 65 of the cover 60. In some embodiments, the flat surface 58 of the raised portion 48 may protrude the out surface 65 of the cover 60.

FIG. 8 is a perspective view of an example embodiment of a cargo blind end cap assembly 10 including the cover 60. FIG. 8 shows that cover 60 may be clipped into a seat belt retainer 20. The raised portion 48 may be exposed from the opening 82 of the cover 60. In the depicted embodiment, the raised portion 48 protrudes from the opening 82.

Now referring to FIG. 2, the endcap 18 may include a housing 84 to receive an end portion of the cargo blind bar 16. The housing 84 may include an end mall 86, a bottom wall 88 and a top wall 90. In some embodiments, the seat belt retainer 20 may be attached to the bottom wall 88. In some embodiments, the seat belt retainer 20 may be integrated to the bottom wall 88 by molding or any suitable method. In some embodiments, the end cap 18 and the seat belt retainer 20 may be formed as a single part by molding. In an embodiment depicted in FIG. 2 and FIG. 5, the bottom surface 25 of the base mar be substantially perpendicular to the bottom wall 88, substantially parallel to the end wall 86 and adjacent to the end wall 86. The second sidewall 34 may be directly attached to the bottom wall 88. When the cargo end cap assembly 10 is disposed in the cargo blind system 12 as illustrated in FIG. 1, the slot 38 inside the slot wall 30 may open in a direction that the cargo blind 24 is pulled out. Once a cargo blind system is installed in a vehicle, the slot 38 may open toward a back door of the vehicle so that it is convenient for a user to insert the seat belt tongue into the slot 38.

In some embodiments, the housing 84 of the end cap may include sidewalls 94 and 96 which are opposite each other. The sidewall 94 may include a recess 98 to allow an edge portion of the cargo blind 24 to pass through. In some embodiments, the sidewall 96 may further include a recess 100 corresponding to the recess 98.

Referring to FIGS. 3 and 5, in some embodiments, the endcap 18 may further include a projection 102 that may be inserted into a clipping socket in the panel of the vehicle such that the cargo blind system may be installed in the vehicle.

Now referring back to FIG. 1, the seat belt retainer 20 may be disposed adjacent to an end of the end cap 18. When the cargo blind end cap assembly 10 is disposed on the cargo blind bar 16, a distance measured between centers of the two slots of the seat belt retainers 20 may be greater than a widest portion of the cargo blind 24.

FIG. 9 is a perspective view of another example embodiment of a cargo blind end cap assembly 110. For the sake of brevity, in this example, the elements and features similar to those previously shown and described will not be described in much further detail. In other words, differences between the present embodiment and the embodiments of FIGS. 1 to 8 will be mainly described. The car blind end cap assembly 110 may include an end cap 118 and a seat belt retainer 120. The seat belt retainer 120 may include a base 126 and a clip 140 attached to the base 126. The base 126 may include a slot sidewall 130 and a sidewall 136 opposite to the slot wall 130. A slot 138 may be formed in the slot sidewall 130 and may have an open channel 132. A clip 140 may be disposed in the seat belt retainer to retain and release a seat belt tongue. The end cap 118 may include a bottom wall 188 and an end wall 186.

In the depicted embodiment, the base 126 may substantially perpendicular to the bottom wall 188, and substantially parallel and adjacent to the end wall 186 of the end cap. The sidewall 136 may be attached to the bottom wall 186 of the end cap 118. As the slot sidewall is disposed away from the end cap 118, the open channel 132 of the slot wall may extend along a direction perpendicular to the bottom wall 188 of the end cap, and the slot 138 or the open channel 132 opens in a direction away from the end cap.

FIG. 10 is a perspective view of another example embodiment of a cargo blind end cap assembly 110. A cover 60 is shown to be disposed on the seat belt retainer 120.

The cargo blind end cap assemblies of the present application have various advantages. For example, when a cargo blind system is installed, a seat belt tongue may be clipped into the seat belt retainer of the cargo blind end cap assembly. Once clipped into the seat belt retainer, the webbing of the seat belt is held out of the way that a cargo blind travels. In this way, the cargo blind can be pulled out smoothly from a cargo blind bar to an extended position without obstruction from the seat belt webbing. Further, as the seat belt retainer is a part of the cargo blind assembly and it is removed along with the cargo blind assembly when the cargo blind system 12 is detached from the vehicle. As such, the vehicle interior panel remains clean look without the presence of the seat belt clips on the vehicle interior panel.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A cargo blind end cap assembly of a vehicle, comprising:
   an end cap including a housing having a recess adapted to receive a cargo blind bar; and
   a seat belt retainer to retain and release a seat belt tongue, wherein the seat belt retainer is connected to the housing of the end cap to form a unitary structure and includes a clip to fasten the seat belt tongue;
   wherein the cargo blind end cap assembly is adapted to be detachably connected to the vehicle.

2. The cargo blind end cap assembly of claim 1, wherein the seat belt retainer comprises a base having a first end and a second end opposite to the first end, and
   wherein the base includes:
   a first sidewall and a second sidewall opposite the first sidewall, wherein the first and second sidewalls are between the first and the second ends,
   a slot sidewall on the first end of the base, and
   a slot formed in the slot sidewall; and
   wherein the clip is disposed on the base, wherein the clip is configured to fasten the seat belt tongue inserted from the slot.

3. The cargo blind end cap assembly of claim 2, wherein the clip is positioned along the first and second sidewalls, and the clip includes a free end adjacent to the slot and a fixed end secured to the base adjacent to the second end of the base.

4. The cargo blind end cap assembly of claim 3, wherein the clip includes a flat strap having a protrusion at the free end, wherein the protrusion has a guide surface to guide the seat belt tongue to move over the protrusion when the seat belt tongue is inserted and an engagement surface substantially perpendicular to the flat strap to engage the seat belt tongue, and wherein the clip has elasticity to allow movement of the free end in a direction substantially perpendicular to a pathway that the seat belt tongue is inserted.

5. The cargo blind end cap assembly of claim 4, wherein the guide surface of the protrusion has an angle to the pathway and is inclined at a steady slope from the flat strap toward the fixed end of the clip, or the guide surface is inclined as convex shaped or a concave shaped from the flat strap toward the fixe end of the clip.

6. The cargo blind end cap assembly of claim 4, wherein the clip further includes a raised portion raised in a same direction as the protrusion projects from the flat strap, and wherein the protrusion disengages the seat belt tongue when a force is applied to the raised portion.

7. The cargo blind end cap assembly of claim 6, wherein the raised portion is formed from bends of the flat strap and has a top surface substantially parallel to a surface of an unraised portion of the flat strap.

8. The cargo blind end cap assembly of claim 7, wherein the seat belt retainer further includes a cover disposed opposite to the base and wherein the cover, the first sidewall, the second sidewall, the slot sidewall and a third sidewall opposite the slot sidewall collectively encloses the clip.

9. The cargo blind end cap assembly of claim 8, wherein the cover includes an opening to expose the raised portion of the clip.

10. The cargo blind end cap assembly of claim 9, wherein the flat surface of the raised portion of the clip is substantially at a same level as an outer surface of the cover or protrudes outside the outer surface of the cover.

11. The cargo blind end cap assembly of claim 10, wherein the cover is snapped into the base or is coupled to the base by screws.

12. The cargo blind end cap assembly of claim 4, wherein the base has an opening and the clip is positioned at least partially inside the opening.

13. A cargo blind end cap assembly of a vehicle, comprising:
an end cap including a housing having a recess adapted to receive a cargo blind bar, and the housing includes an end wall, a bottom wall and a top wall; and
a seat belt retainer to retain and release a seat belt tongue of a seat belt, wherein the seat belt retainer is connected to the housing of the end cap to form a unitary structure and includes a clip to fasten the seat belt tongue;
wherein the seat belt retainer is attached to the bottom wall of the end cap; and
wherein the cargo blind end cap assembly is adapted to be detachably connected to the vehicle.

14. The cargo blind end cap assembly of claim 13, wherein the seat belt retainer includes a base and the base of the seat belt retainer is disposed substantially perpendicular to the bottom wall, and substantially parallel to the end wall of the end cap and adjacent to the end wall of the end cap.

15. The cargo blind end cap assembly of claim 14, wherein the base includes a first sidewall and a second sidewall opposite the first sidewall, a slot sidewall on a first end of the base, and a slot formed in the slot sidewall, and wherein the clip is disposed on the base, wherein an open channel of the slot extends along a direction substantially parallel to the end wall of the end cap, and the slot inside the slot sidewall opens in a direction that a cargo blind is pulled out.

16. The cargo blind end cap assembly of claim 14, wherein the base includes a first sidewall and a second sidewall opposite the first sidewall, a slot sidewall on a first end of the base, and a slot formed in the slot sidewall, and wherein the clip is disposed on the base, wherein an open channel of the slot sidewall extends along a direction perpendicular to the bottom wall of the end cap, and the slot inside the slot sidewall opens in a direction away from the end cap.

17. The cargo blind end cap assembly of claim 13, wherein the seat belt retainer is integrally formed with the end cap.

18. A cargo blind system of a vehicle, comprising:
a cargo blind;
a cargo blind bar to store and release the cargo blind;
a first cargo blind end cap assembly including:
a first end cap including a housing having a recess adapted to receive one end of the cargo blind bar; and
a first seat belt retainer to retain and release a first seat belt tongue, wherein the first seat belt retainer includes a slot formed in a slot sidewall, and a clip configured to fasten the first seat belt tongue inserted from the slot, wherein the first seat belt retainer is attached to the housing of the first end cap to form a first unitary structure; and
a second cargo blind end cap assembly including:
a second end cap including a housing having a recess adapted to receive another end of the cargo blind bar; and
a second seat belt retainer to retain and release a second seat belt tongue, wherein the second seat belt retainer includes a slot formed in a slot sidewall, and a clip configured to fasten the second seat belt tongue inserted from the slot, wherein the second seat belt retainer is attached to the housing of the second end cap to form a second unitary structure.

19. The cargo blind system of claim 18, wherein the first and second seat belt retainers receive the first and second seat belt tongues of the vehicle, respectively, when the cargo blind system is installed in the vehicle and back seats are put down to provide a cargo space.

20. The cargo blind system of claim 19, wherein a distance between a center of the slot of the first seat belt retainer and a center of the slot of the second seat belt retainer is greater than a widest portion of the cargo blind.

* * * * *